Figure 1A:
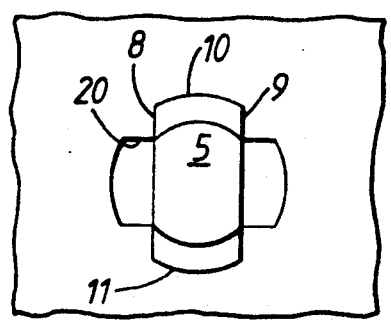

United States Patent [19]

Waterfield et al.

[11] Patent Number: 5,076,748

[45] Date of Patent: Dec. 31, 1991

[54] QUICK RELEASE STRUCTURAL FASTENER

[75] Inventors: Richard Waterfield, Groby; Adrian Q. Lindley, Colsterworth, both of Great Britain

[73] Assignee: Camloc (U.K.) Limited, Leicester, England

[21] Appl. No.: 619,912

[22] Filed: Nov. 30, 1990

[30] Foreign Application Priority Data

Dec. 4, 1989 [GB] United Kingdom ................ 8927366
Jan. 23, 1990 [GB] United Kingdom ................ 9001496

[51] Int. Cl.$^5$ ............................................. F16B 21/00
[52] U.S. Cl. ...................................... 411/551; 411/84; 411/107; 403/408.1
[58] Field of Search ................... 411/84, 85, 107, 349, 411/549, 550, 551, 552, 553, 554; 403/408.1

[56] References Cited

U.S. PATENT DOCUMENTS

| | | | |
|---|---|---|---|
| 1,296,275 | 3/1919 | Firth | 411/368 |
| 2,183,085 | 12/1939 | Richardson | 411/554 |
| 2,399,181 | 4/1946 | Graham | 411/554 |
| 2,444,040 | 6/1948 | Gower | 411/554 |
| 3,186,049 | 6/1965 | Fiddler | 411/84 |
| 3,480,311 | 11/1969 | Lanham, Jr. | 403/408.1 |

Primary Examiner—Neill R. Wilson
Attorney, Agent, or Firm—Oblon, Spivak, McClelland, Maier & Neustadt

[57] ABSTRACT

A structural fastener for blind fixing to a member with an elongate slot comprising a stud within an elongate head which allows the head to be inserted through the slot, the stud then being rotated to move the head out of register with the slot preventing withdrawal of the stud. The shank of the stud has a threaded portion in which a nut is mounted, and further includes a region between the head and the threaded portion which is non-circular and permits limited rotation of the stud after the head has been inserted through the slot, and thereafter engages the sides of the slot to prevent further rotation of the stud in the same direction, thus allowing tightening of the nut to clamp one or more items between the head and the nut.

13 Claims, 1 Drawing Sheet

QUICK RELEASE STRUCTURAL FASTENER

This invention relates to a quick release structural fastener and in the preferred embodiment provides a structural fastener suitable for blind fixing to a member formed with a suitably shaped aperture or slot to receive part of the fastener. A fastener of the preferred embodiment is particularly suited to the fastening together of structural members of a portable building, but may be used for any purpose for which a quick release structural fastening is required.

According to the present invention there is provided a structural fastener comprising: a stud having a head which is elongate in a direction normal to the axis of the stud whereby the head may be inserted through an elongate slot and the stud rotated to move the head out of register with the slot and thus prevent withdrawal of the head through the slot, and a shank extending from the head and having a threaded portion at the end thereof remote from the head; and a nut mounted on the threaded portion for clamping one or more items between the head and the nut, wherein the shank includes a region between the head and the threaded portion which is non-circular and which permits limited rotation of the stud after the head has been inserted through the slot and thereafter engages the walls of the slot to prevent further rotation of the stud in the same direction.

Preferably the non-circular region permits rotation of the stud through 90° after the head has been inserted through the slot and thereafter prevents further rotation of the stud. With this arrangement, if the head of the stud is inserted through the slot and the stud is rotated to the limit of rotation provided by the non-circular portion, the head will be 90° out of register with the slot.

Preferably, the non-circular region is, in transverse cross-section, in the form of a square from which one pair of diametrically opposed corners have been removed. Preferably, each removed corner is replaced by an arcuate surface which blends into the adjacent flat surfaces of the square cross-section.

Preferably a generally cup-shaped washer is positioned between the nut and the head and is held captive on the stud with the hollow portion of the cup-shape facing the head and sized at least partially to receive the non-circular region of the shank. With such an arrangement, the fastener may be used to fasten together members having a total thickness which is less than the axial extent of the non-circular region.

In a particularly preferred embodiment of the invention the shank includes a second non-circular region between the head and the first non-circular region, the second non-circular region being such that after the stud has been rotated to the limit provided by the first non-circular region the second non-circular region may enter the slot and, whilst in the slot, prevent reverse rotation of the stud. Such an arrangement has the advantage of preventing accidental backing off of the fastener after the nut has been tightened.

Whilst the invention is particularly suitable for fastening together structural members it will be appreciated that the fastener may be used for the purpose of forming an anchorage on a structural member.

Figure 1:
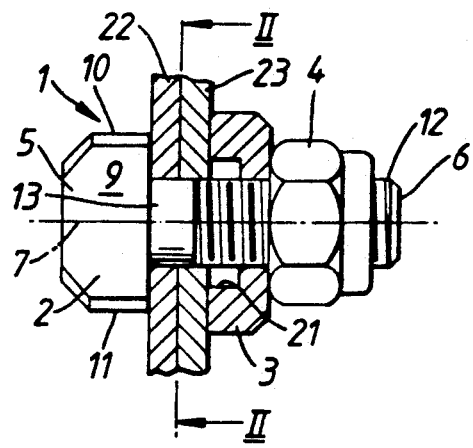
Figure 2:
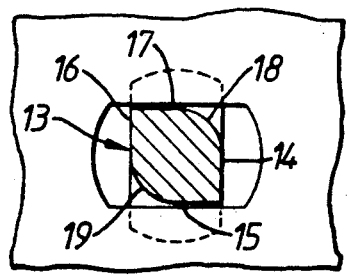
Figure 3:
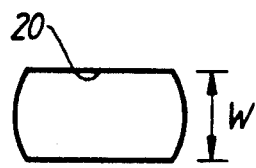
Figure 4:
Figure 5:
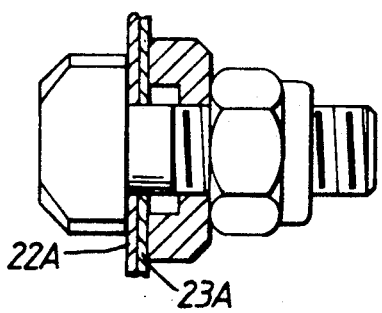
Figure 6:
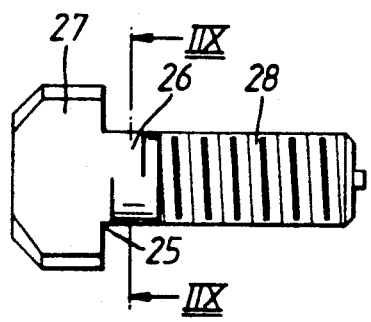
Figure 7:
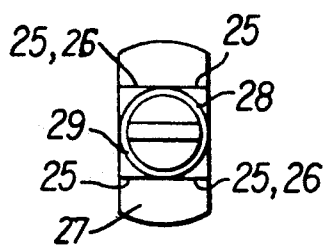
Figure 8:
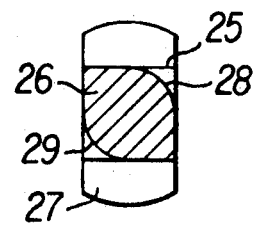

The invention will be better understood from the following description of a preferred embodiment thereof, given by way of example only, reference being had to the accompanying drawing wherein:

FIG. 1 is a transverse partially sectioned view of a preferred embodiment of the invention;
FIG. 1A is an end view of the fastener of FIG. 1;
FIG. 2 is a cross-section on the line II—II of FIG. 1;
FIGS. 3 and 4 illustrate alternative shapes of slot;
FIG. 5 illustrates the fastener of FIG. 1 being used to secure together two relatively thin members;
FIG. 6 is a side view of a stud of a further embodiment of the invention;
FIG. 7 is an end view of the stud of FIG. 6; and
FIG. 8 is a section on the line IIX—IIX of FIG. 6.

Referring firstly to FIGS. 1 and 1A the illustrated embodiment of structural fastener 1 comprises a stud 2, a cup-shaped washer 3, and a self-locking nut 4.

The stud 2 comprises a head 5 and a shank 6. The head 5 is elongate in a direction normal to the longitudinal axis 7 of the stud and, in the illustrated embodiment, is bounded on opposite sides by flat surfaces 8,9 and on opposite ends by part-circular surfaces 10,11. The shank 6 includes a threaded portion 12 at the end of the shank remote from the head 5, and a non-circular region 13 located between the head 5 and the threaded portion 12.

The cross-sectional shape of the non-circular region 13 is best seen in FIG. 2. The region 13 is bounded by flat surfaces 14–17 which, if extended to their respective intersections, would form a square. However, the corners formed at the notional intersection of sides 14 and 17 on the one hand and 15 and 16 on the other hand are replaced by circular curved surfaces 18,19 respectively, the surface 18 blending into adjacent surfaces 14 and 17 and the surface 19 blending into adjacent surfaces 15 and 16.

In use, the fastener 1 is used in association with a slot formed in a structural member. The preferred form of slot 20 is illustrated in FIG. 3 and comprises an aperture which is of the same general shape as the transverse cross-section of the head 5, but slightly larger than the head 5 whereby the head 5 may be passed through the aperture with a slight clearance. The width W of the slot 20 substantially corresponds to the length of side of the notional square formed by walls 14–17 of the non-circular region 13.

The washer 3 is cup-shaped and includes a recess 21 which is open towards the head 5 of the stud. The recess 21 is sized to receive the non-circular region 13.

As illustrated in FIG. 1, the fastener 1 is being used to secure together structural members 22,23, for example frame members of a portable building. Each member 22,23 is formed with an aperture of the form illustrated in FIG. 3. To position the fastener, the apertures 20 of the structural members 22,23 are aligned and the head 5 is aligned with the aligned apertures and is inserted through the apertures to lie on the side of the apertures remote from the nut 4. The stud 2 is then rotated either by hand or by applying a spanner to the nut 4. The stud should be rotated in the tightening direction of the nut 4. If a spanner is applied to the nut 4 to procure the desired rotation, the nut will tend to rotate the stud by virtue of the self locking nature of the nut, and during this initial phase of installation there will be no relative rotation between the nut 4 and the shank 6. After rotation through 90° the faces 15 and 17 of the non-circular region will contact the corresponding edges of the slot 20, and further rotation of the stud will be prevented. At this point, the head 5 is 90° out of register with the slot 20 and accordingly the head 5 cannot be withdrawn through the slot 20. The nut 4 is then tightened in conventional manner to clamp the structural members 22 and 23 between the head 5 and the washer 3.

To release the fastener the nut 4 is rotated in the loosening direction. When the resistance to rotation of the stud 2 falls to below the resistance to rotation of the nut 4 on the shank 6 the fastening will turn as a unit through 90° until the faces 14 and 16 of the non-circular region abut the edges of the slot 20. At this point the head 5 will be in register with the slot, and the fastener may be removed.

It will be noted that the longitudinal position of the fastener within the slot 20 is not critical, and accordingly if the slots are made somewhat over length the fastener is able to accommodate a certain amount of longitudinal misalignment of the slots. The particular form of the slots is not critical so long as the width of the slot W substantially corresponds to the across flats dimension of the non-circular portion 13.

As shown in FIG. 5, the fastener may be used to clamp together structural members 22A and 23A the total thickness of which is less than the axial extent of the non-circular region 13.

Referring now to FIGS. 6-8 a modified embodiment of the invention is illustrated. This embodiment is substantially identical to that of FIGS. 1-5 except that a second non-circular region 25 is provided between a first non-circular region 26 and the head 27. The first non-circular region 26 has substantially the form of the non-circular region 13 of the embodiment of FIGS. 1-5 including a pair of attenuated corners 28 and 29 corresponding to the corners 18 and 19 shown in FIG. 2. The second non-circular region 25 is square when viewed from the end of the fastener and has a side to side width equal to the side to side width of the head 27. The cross-sectional shapes of the two regions 25 and 26 should be apparent from a consideration of FIGS. 7 and 8.

In use, the stud of FIGS. 6-8 is offered up to an appropriately sized slot and the head 27 and second non-circular region 25 are passed through the slot. The stud is then rotated by turning the threaded portion 28 until further rotation is prevented by the first non-circular region 26. As a nut located on the region 28 is then tightened the second non-circular region 25 is drawn into the slot and, once it has entered the slot, it prevents reverse rotation of the stud. Hence, any accidental backing off of the head 27 from the position perpendicular to the slot is prevented.

Whilst the fastener is primarily intended for structural interconnection of two members, it will be appreciated that it may be used to provide an anchorage on a single member if so desired.

We claim:

1. A structural fastener comprising a stud having a head and a shank extending from the head along a longitudinal axis, the head being elongate in a direction normal to the longitudinal axis and adapted to be inserted through an elongate slot in at least one item, the shank having a threaded portion at an end thereof remote from the head, and said slot having two substantially parallel walls; means for rotating said stud to move the head out of register with the slot preventing withdrawal of the head through the slot; and a nut mounted on said threaded portion for clamping said at least one item between the head and the nut; wherein said shank includes a first region between the head and the threaded portion, said first region having a non-circular transverse cross-section providing means for permitting limited rotation of the stud in a first direction after the head has been inserted through the slot, and means for engaging said two walls of the slot and preventing further rotation of the stud in said first direction after said limited rotation is achieved; said structural fastener additionally comprising a generally cup-shaped washer having a hollow portion, said washer being positioned between the nut and the head and held captive on the shank with the hollow portion facing the head, said washer being sized at least partially to receive said first non-circular region of the shank.

2. A structural fastener according to claim 1 wherein said means for permitting limited rotation include means for permitting rotation of the stud through 90° in said first direction after the head has been inserted through the slot.

3. A structural fastener according to claim 2 wherein said first non-circular region has a substantially square shaped cross-section having four flat sides, two diametrically opposed right-angled corners, and two diametrically opposed attenuated corners.

4. A structural fastener according to claim 3 wherein each of said two attenuated corners has been an arcuate surface which blends into each adjacent flat side of the substantially square cross-section.

5. A structural fastener according to claim 1 wherein said first non-circular region has an axial extent along said shank and wherein said at least one item has a total thickness less than the said axial extent.

6. A structural fastener according to claim 5 wherein said nut is a self locking net and said means for rotating said stud are provided by said nut.

7. A structural fastener comprising a stud having a head and a shank extending from the head along a longitudinal axis, the head being elongate in a direction normal to the longitudinal axis and adapted to be inserted through an elongate sot in at least one item, the shank having a threaded portion at an end thereof remote from the head and said slot having two substantially parallel walls; means for rotating said stud to move the head out of register with the slot preventing withdrawal of the head through the slot; and a nut mounted on said threaded portion for clamping said at least one item between the head and the nut; wherein said shank includes a first region between the head and the threaded portion, said first region having a non-circular transverse cross-section providing means for permitting limited rotation of the stud in a first direction after the head has been inserted through the slot, and means for engaging said two walls of the slot and preventing further rotation of the stud in said first direction after said limited rotation is achieved; and wherein said shank includes a second region between the head and said first non-circular region, said second region having a non-circular transverse cross-section providing means whereby, after the stud has been rotated to the limit provided by the first non-circular region, said second region enters the slot and prevents rotation of the stud in a second direction opposite to said first direction.

8. A structural fastener according to claim 7 wherein said means for permitting limited rotation includes means for permitting rotation of the stud through 90° in said first direction after the head has been inserted through the slot.

9. A structural fastener according to claim 8 wherein said first non-circular region has a substantially square shaped cross-section having four flat sides, two diametrically opposed right-angled corners, and two diametrically opposed attenuated corners.

10. A structural fastener according to claim 9 wherein each of said two attenuated corners has been an arcuate surface which blends into each adjacent flat side of the substantially square cross-section.

11. A structural fastener according to claim 7 additionally comprising a generally cup-shaped washer having a hollow portion, said washer being positioned between the nut and the head and held captive on the shank with the hollow portion facing the head, said washer being sized at least partially to receive said first non-circular region of the shank.

12. A structural fastener according to claim 7 wherein said nut is a self locking net and said means for rotating said stud are provided by said nut.

13. A structural fastener according to claim 7 wherein said second region has a substantially square shaped transverse cross-section.

* * * * *